(12) United States Patent
Kim et al.

(10) Patent No.: US 8,442,713 B2
(45) Date of Patent: May 14, 2013

(54) STEERING METHOD FOR VEHICLE AND APPARATUS THEREOF

(75) Inventors: Hyoun Jin Kim, Seoul (KR); Yongsoon Yoon, Seoul (KR)

(73) Assignee: Seoul National University Industry Foundation (KR)

( * ) Notice: Subject to any disclaimer, the term of this patent is extended or adjusted under 35 U.S.C. 154(b) by 330 days.

(21) Appl. No.: 12/937,521

(22) PCT Filed: Jan. 13, 2009

(86) PCT No.: PCT/KR2009/000171
§ 371 (c)(1),
(2), (4) Date: Oct. 12, 2010

(87) PCT Pub. No.: WO2009/125916
PCT Pub. Date: Oct. 15, 2009

(65) Prior Publication Data
US 2011/0035086 A1  Feb. 10, 2011

(30) Foreign Application Priority Data

Apr. 12, 2008 (KR) .................. 10-2008-0033977

(51) Int. Cl.
*B62D 6/00* (2006.01)
*G06F 19/00* (2006.01)
(52) U.S. Cl.
USPC ............... 701/23; 701/42; 701/301; 340/435
(58) Field of Classification Search ............ 701/23, 701/26, 28, 300, 301, 42, 96, 423; 340/435, 340/436
See application file for complete search history.

(56) References Cited

U.S. PATENT DOCUMENTS

| 7,079,943 | B2 * | 7/2006 | Flann et al. | 701/423 |
| 7,865,277 | B1 * | 1/2011 | Larson et al. | 701/23 |
| 2005/0075784 | A1 * | 4/2005 | Gray et al. | 701/201 |
| 2009/0093960 | A1 * | 4/2009 | Puhalla et al. | 701/301 |

FOREIGN PATENT DOCUMENTS

| JP | 10-78823 | 3/1998 |
| JP | 2007-310698 | 11/2007 |
| JP | 2007-326521 | 12/2007 |
| KR | 10-2008-26382 | 3/2008 |

OTHER PUBLICATIONS

International Search Report mailed Jul. 14, 2009 for PCT/KR2009/000171.

(Continued)

*Primary Examiner* — Tan Q Nguyen
(74) *Attorney, Agent, or Firm* — Cantor Colburn LLP

(57) ABSTRACT

The present invention relates to an apparatus and a method for steering a vehicle, and more particularly to an apparatus and a method for steering an autonomous vehicle. One aspect of the present invention provides a method of steering a vehicle in an apparatus for steering the vehicle, the method comprising: (a) determining a first path by using a starting point and a destination of the vehicle; (b) generating an obstacle position signal when a plurality of obstacle sensors mounted on the vehicle detect an obstacle during an operation of the vehicle; (c) generating a parallax information using the obstacle position signal received from the plurality of the obstacle sensors; and (d) determining a second path avoiding the obstacle by using the parallax information. According to the method and the apparatus for steering a vehicle of the present invention, a vehicle may avoid obstacles in real-time in complex environments.

12 Claims, 8 Drawing Sheets

OTHER PUBLICATIONS

Office Notice of Rejection from the Korean Patent Office mailed on Jul. 6, 2009.
English translation of JP 2007-310698.
English translation of JP-2007-326521.
English translation of KR 10-2008-26382.
English translation of JP 1998-78823.

* cited by examiner

STEERING METHOD FOR VEHICLE AND APPARATUS THEREOF

BACKGROUND OF THE INVENTION

1. Field of the Invention

The present invention relates to an apparatus and a method for steering a vehicle, and more particularly to an apparatus and a method for steering an autonomous vehicle.

2. Description of the Related Art

UGVs (unmanned ground vehicles) are employed in various military and civil applications, which often require UGVs to move autonomously in unknown environments with dynamic and physical constraints, rather than to simply follow a pre-planned path designated by an offline mission-level planning algorithm.

This application is related to an active steering problem of a UGV in complex environments. For the dynamic trajectory generation problem with obstacle avoidance, a model predictive method based on successive online optimal control is employed. In order to use this approach for the UGV, a bicycle model may be used combined with a nonlinear tire-force model to predict the future evolution of the system.

Much research on local obstacle avoidance has been performed, most of which use reactive methods based on sensor data. Some take into account the simple robot dynamics in terms of velocity or turning radius. These approaches are computationally efficient, but the vehicle can get stuck in local minima, sometimes the discretization of the world is required, or incorporation of the complicated dynamics is not easy. A search was used on a trajectory tree of a fixed depth, the dimension of the vehicle was considered with a reduced dynamic window. But as will be shown later, consideration of the location of center of gravity of the vehicle may not suffice for obstacle avoidance in a cramped area.

Recently, predictive active steering control for autonomous vehicle systems was studied, with a tire model, where the autonomous vehicle was directed to follow the given reference which is assumed to be collision-free and achievable by the vehicle.

However, in the case of unknown environments, it is difficult to acquire such a safe pre-defined reference. In addition, because the dimension of the vehicle is not explicitly considered, if the environment is complex and cluttered, it can be a serious issue. Also the previous approach might be limited in the implementation point of view. For real implementation onto UGVs, each optimization should be performed within the given sampling time, which is often in the order of 10 ms or shorter.

SUMMARY OF THE INVENTION

The present invention has been made in view of the above problems, and provides a method and an apparatus for steering a vehicle in which the vehicle may avoid obstacles during its operation with consideration of a shape or a dimension of the vehicle.

The present invention also provides a method and an apparatus for steering a vehicle in which the vehicle may avoid obstacles in real-time in complex environments.

The present invention also provides a method and an apparatus for steering a vehicle in which a collision-free trajectory can be generated at a high computational efficiency, with consideration of a speed of the vehicle, shapes of the vehicle and obstacles, a driving condition and a current moving direction of the vehicle.

Other technical problems addressed by the present invention will be easily understood by referring to the descriptions below.

According to one aspect of the present invention, provided is a method of steering a vehicle in an apparatus for steering the vehicle, the method comprising: (a) determining a first path by using a starting point and a destination of the vehicle; (b) generating an obstacle position signal when a plurality of obstacle sensors mounted on the vehicle detect an obstacle during an operation of the vehicle; (c) generating a parallax information using the obstacle position signal received from the plurality of the obstacle sensors; and (d) determining a second path avoiding the obstacle by using the parallax information.

In addition, according to another aspect of the present invention, provided is an apparatus for steering a vehicle, the apparatus comprising: a path determination unit configured to determine a first path by using a starting point and a destination of the vehicle and determine a second path that avoids an obstacle by using a parallax information; an obstacle sensor configured to generate an obstacle position signal by detecting the obstacle during an operation of the vehicle; and a parallax information generation unit configured to generate the parallax information by using the obstacle position signal and transmit the parallax information to the path determination unit.

Here, the vehicle may be an unmanned ground vehicle (UGV).

Here, the path determination unit may determine the second path by using a model predictive approach.

Here, the second path determined by the model predictive approach may have variables that minimize a cost function, which is expressed in the following equation:

$$J(\xi_t, u_t) = \phi(\tilde{\eta}_{N,t}) + \sum_{k=0}^{N-1} L(\tilde{\eta}_{k,t}, u_{k,t})$$

wherein, $\xi_t$ is a state variable vector at a time t, $u_t$ is a control input vector, $$\phi(\tilde{\eta}_{N,t}) = \frac{1}{2}\tilde{\eta}_{N,t}^T P \tilde{\eta}_{N,t},$$

$$L(\tilde{\eta}_{k,t}, u_{k,t}) = \frac{1}{2}\tilde{\eta}_{k,t}^T Q \tilde{\eta}_{k,t} + \frac{1}{2}u_{k,t}^T R u_{k,t}$$

(P, Q and R are constant weighting matrices, N is a length of a look-ahead horizontal, $\tilde{\eta}_{k,t} = \eta_{k,t,ref} - \eta_{k,t}$, $\eta_{k,t,ref}$ is a coordinate of the first path, $\eta_{k,t}$ is a coordinate of a center of gravity of the vehicle in an inertial frame).

Here, a parallax cost function may further be included in a second term of the cost function so that the parallax information is used in determining the second path, the parallax cost function being expressed as follows:

$$PF_{obs,k,t,i,j} =$$

$$\begin{cases} 0, & \text{no obstacle exists in the sensing range,} \\ \max_i K_{obs} \exp\left(\dfrac{\tilde{\theta}_{f,k,t,i}}{\theta_{f,c}(\upsilon)}\right), & p_{k,t,i} \text{ exists in the sensing range,} \\ \max_i K_{obs} \exp\left(\dfrac{\tilde{\theta}_{r,k,t,j}}{\theta_{r,c}(\upsilon)}\right), & q_{k,t,j} \text{ exists in the sensing range,} \\ \max_{i,j} K_{obs} \exp\left(\dfrac{\tilde{\theta}_{f,k,t,i}}{\theta_{f,c}(\upsilon)} + \dfrac{\tilde{\theta}_{r,k,t,j}}{\theta_{r,c}(\upsilon)}\right), & p_{k,t,i} \text{ and } q_{k,t,j} \text{ exist in the sensing range,} \end{cases}$$

wherein, $\tilde{\theta}_{f,k,t,i} = \pi - [(\theta_{fl,k,t,i} - \beta_{fl,k,t}) + (\theta_{fr,k,t,i} + \beta_{fr,k,t})]$, $\tilde{\theta}_{r,k,t,i} = \pi - [(\theta_{rl,k,t,j} - \beta_{rl,k,t}) + (\theta_{rr,k,t,j} + \beta_{rr,k,t})]$, $$\theta_{fl,k,t,i} = \tan^{-1}\dfrac{p_{x,k,t,i} - \dfrac{L}{2}}{\dfrac{W}{2} - p_{y,k,t,i}}, \quad \theta_{fr,k,t,i} = \tan^{-1}\dfrac{p_{x,k,t,i} - \dfrac{L}{2}}{\dfrac{W}{2} + p_{y,k,t,i}}$$

$$\theta_{rl,k,t,j} = \tan^{-1}\dfrac{q_{x,k,t,j} + \dfrac{L}{2}}{\dfrac{W}{2} - q_{y,k,t,j}}, \quad \theta_{rr,k,t,j} = \tan^{-1}\dfrac{q_{x,k,t,j} + \dfrac{L}{2}}{\dfrac{W}{2} + q_{y,k,t,j}}$$

$$\beta_{fl,k,t} = \tan^{-1}\dfrac{\upsilon\sin\beta_{k,t} + \dfrac{L}{2}\dot{\varphi}_{k,t}}{\upsilon\cos\beta_{k,t} - \dfrac{W}{2}\dot{\varphi}_{k,t}}, \quad \beta_{fr,k,t} = \tan^{-1}\dfrac{\upsilon\sin\beta_{k,t} + \dfrac{L}{2}\dot{\varphi}_{k,t}}{\upsilon\cos\beta_{k,t} + \dfrac{W}{2}\dot{\varphi}_{k,t}}$$

$$\beta_{rl,k,t} = \tan^{-1}\dfrac{\upsilon\sin\beta_{k,t} - \dfrac{L}{2}\dot{\varphi}_{k,t}}{\upsilon\cos\beta_{k,t} - \dfrac{W}{2}\dot{\varphi}_{k,t}}, \quad \beta_{rr,k,t} = \tan^{-1}\dfrac{\upsilon\sin\beta_{k,t} - \dfrac{L}{2}\dot{\varphi}_{k,t}}{\upsilon\cos\beta_{k,t} + \dfrac{W}{2}\dot{\varphi}_{k,t}}$$

$$\theta_{f,c} = \dfrac{K_{MP,f}}{\upsilon}, \quad \theta_{r,c} = \dfrac{K_{MP,r}}{\upsilon},$$

$K_{obs}$ is a weighting parameter, $K_{MP,f}$ and $K_{MP,r}$ are weighting values, $p_{k,t,i}$ is a coordinate of an i-th obstacle detected within a front sensing range at the time t, $q_{k,t,j}$ is a coordinate of a j-th obstacle detected within a side sensing range at the time t, L is an axle length of the vehicle, W is a width of the vehicle, $\beta_{fl,k,t}$, $\beta_{fr,k,t}$, $\beta_{rl,k,t}$, and $\beta_{rr,k,t}$ are moving direction angles at four vertices of the vehicle, respectively, $\beta_{k,t}$ is a moving direction angle of the center of the gravity of the vehicle, $\varphi_{k,t}$ is a yaw angle, $\upsilon$ is a velocity of the vehicle.

Here, a second term of the cost function may further include the following term:

$$\lambda_k h(\xi_{k,t}, u_{k,t}) + \mu_u G_u(u_{k,t}) + \mu_{\delta_f} G_{\delta_f}(\delta_{f,k,t}) + \mu_{\alpha_f} G_{\alpha_f}(\alpha_{f,k,t}) + \mu_{\alpha_r} G_{\alpha_r}(\alpha_{r,k,t})$$

wherein, $\lambda_k$ is Lagrange multiplier, $h(\xi_{k,t}, u_{k,t})$ is a coordinate of the center of the gravity of the vehicle in an inertial frame for $(\xi_{k,t}, u_{k,t})$, $\mu_u$, $\mu_{\delta_f}$, $\mu_{\alpha_f}$, $\mu_{\alpha_r}$ are KKT (Karush-Kuhn-Tucker) variables representing weighting parameters for saturation constraints, $$G_u(u_{k,t}) = \begin{cases} \dfrac{1}{2} g_u(u_{k,t})^2, & \text{if } g_u(u_{k,t}) > 0 \\ 0, & \text{if } g_u(u_{k,t}) \leq 0, \end{cases}$$

$$G_{\delta_f}(\delta_{f,k,t}) = \begin{cases} \dfrac{1}{2} g_{\delta_f}(\delta_{f,k,t})^2, & \text{if } g_{\delta_f}(\delta_{f,k,t}) > 0 \\ 0, & \text{if } g_{\delta_f}(\delta_{f,k,t}) \leq 0, \end{cases}$$

$$G_{\alpha_f}(\alpha_{f,k,t}) = \begin{cases} \dfrac{1}{2} g_{\alpha_f}(\alpha_{f,k,t})^2, & \text{if } g_{\alpha_f}(\alpha_{f,k,t}) > 0 \\ 0, & \text{if } g_{\alpha_f}(\alpha_{f,k,t}) \leq 0, \end{cases}$$

$$G_{\alpha_r}(\alpha_{r,k,t}) = \begin{cases} \dfrac{1}{2} g_{\alpha_r}(\alpha_{r,k,t})^2, & \text{if } g_{\alpha_r}(\alpha_{r,k,t}) > 0 \\ 0, & \text{if } g_{\alpha_r}(\alpha_{r,k,t}) \leq 0, \end{cases}$$

$$g_u(u_{k,t}) = |u_{k,t}| - u_{sat} \leq 0,$$

$$g_{\delta_f}(u_{f,k,t}) = |\delta_{f,k,t}| - \delta_{f,sat} \leq 0,$$

$$g_{\alpha_f}(\alpha_{f,k,t}) = |\alpha_{f,k,t}| - \alpha_{f,sat} \leq 0,$$

$$g_{\alpha_r}(\alpha_{r,k,t}) = |\alpha_{r,k,t}| - \alpha_{r,sat} \leq 0,$$

$\delta_f$ is a front steering angle of the vehicle, $\alpha_f$, $\alpha_r$ are front and rear tire slip angles, respectively, and a subscript sat indicates a saturation constraint.

According to the method and the apparatus for steering a vehicle of the present invention, a vehicle may avoid obstacles during its operation with consideration of a shape and a dimension of the vehicle.

Also, according to the method and the apparatus for steering a vehicle of the present invention, a vehicle may avoid obstacles in real-time in complex environments.

Further, according to the method and the apparatus for steering a vehicle of the present invention, a collision-free trajectory can be generated at a high computational efficiency, with consideration of a speed, a shape, a dimension and an actual moving direction of a vehicle.

BRIEF DESCRIPTION OF THE DRAWINGS

The objects, features and advantages of the present invention will be more apparent from the following detailed description in conjunction with the accompanying drawings, in which.

DESCRIPTION OF EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein. Accordingly, example embodiments are to cover all modifications, equivalents, and alternatives falling within the scope of the invention.

It will be understood that, although the terms first, second, etc. may be used herein to describe various elements, these elements should not be limited by these terms. These terms are only used to distinguish one element from another.

It will be understood that, when a feature or element is referred to as being "connected" or "coupled" to another feature or element, it can be directly connected or coupled to the other element or intervening elements may be present. In contrast, when a feature or element is referred to as being "directly connected" or "directly coupled" to another element, there are no intervening elements present.

The terminology used herein is for the purpose of describing particular embodiments only and is not intended to be limiting of example embodiments of the invention. It will be understood that the terms "comprises," or "includes," when used herein, specify the presence of stated features, integers, steps, operations, elements, and/or components, but do not preclude the presence or addition of one or more other features, integers, steps, operations, elements, components, and/or groups thereof.

Like numbers are used throughout the drawings to refer to the same or like parts and a repetitive explanation will be omitted. Detailed descriptions of well-known functions and structures incorporated herein may be omitted to avoid obscuring the subject matter of the present invention.

Figure 1:
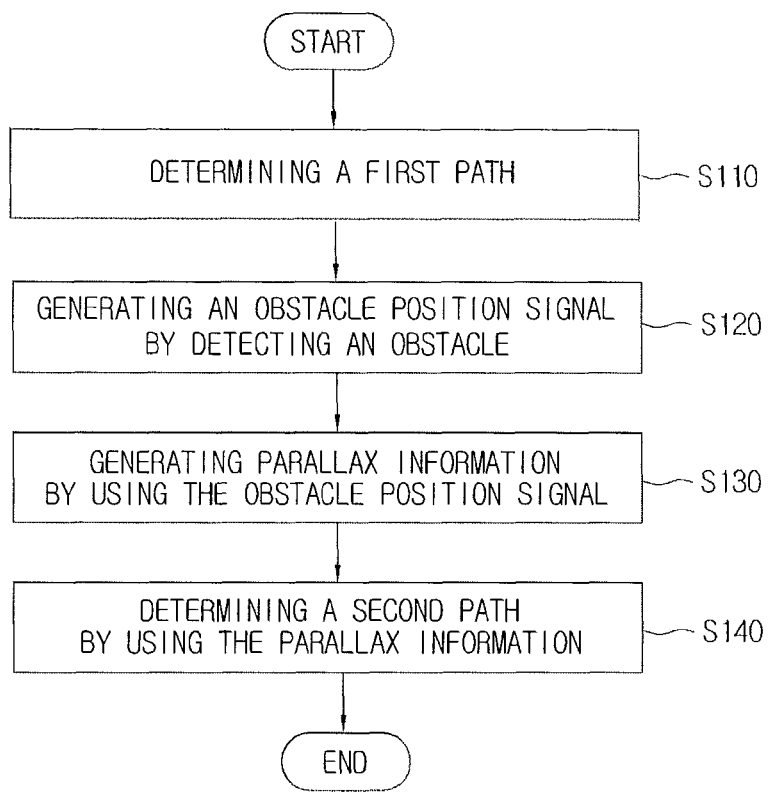
FIG. 1 is a flowchart diagram illustrating a method of steering a vehicle according to an example embodiment of the present invention.

FIG. 1 is a schematic flowchart diagram illustrating a method of steering a vehicle according to an example embodiment of the present invention. Here, the vehicle may be an autonomous vehicle with an autonomous steering capability, particularly an unmanned ground vehicle (UGV). Also, an obstacle discussed in the present disclosure may include a stationary obstacle and a moving obstacle. The moving obstacle may be an obstacle of which position changes at every sampling time, for example, a pedestrian or another vehicle moving in the same or opposite direction. The following description assumes that the vehicle is an unmanned ground vehicle and the obstacle is a stationary obstacle.

In step S110, a steering apparatus of the unmanned ground vehicle determines a first path by using a starting point and a destination. The first path can be a straight line from the starting point to the destination. A method of determining the second path which avoids various obstacles that exist on the first path will be described below.

In step S120, a plurality of obstacle sensors mounted on the unmanned ground vehicle detect an obstacle during a travel of the vehicle and generate an obstacle position signal.

The obstacle position signal, which will be further described below, contains an information of, for example, a coordinate of the obstacle and angles between a line of sight toward the obstacle at each vertex and the moving direction of the vehicle. A corresponding formula thereof will be discussed below in detail.

In step S130, the steering apparatus generates a parallax information by using the obstacle position signal received from the plurality of the obstacle sensors.

A human perceives a distance from an object as parallax. Here, the parallax is an angle between straight lines from two different observation points to the object. A principle of the parallax is applied here, with modification to reflect an actual moving direction of the unmanned ground vehicle.

Here, the parallax information may include an information about, for example, a human sense of sight with consideration of moving direction angles at four vertices, a moving direction angle of a center of gravity, a yaw angle, a speed of the unmanned ground vehicle and the like.

In step S140, a second path is determined to avoid the obstacle by using the parallax information. The unmanned ground vehicle is then controlled to travel along the generated second path.

Figure 2:
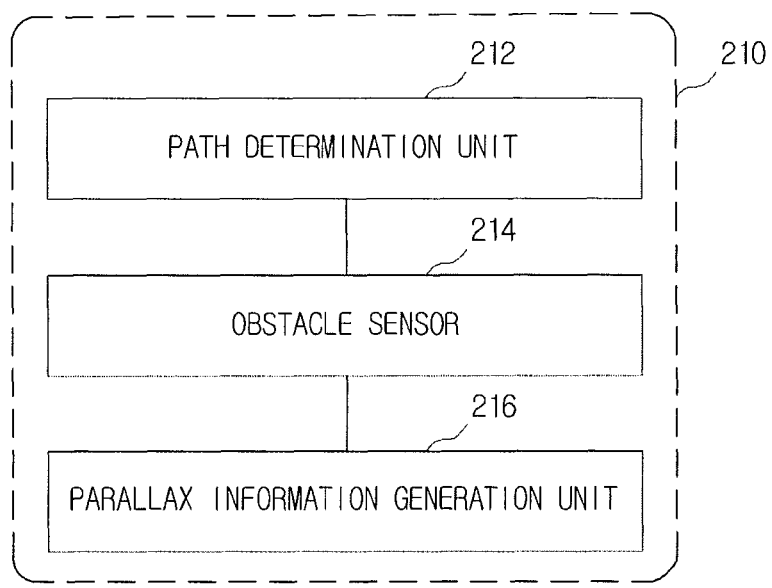
FIG. 2 is a block diagram illustrating an apparatus for steering a vehicle according to an example embodiment of the present invention.

FIG. 2 is a block diagram illustrating a steering apparatus 210 of a vehicle that performs the above described steering method. Referring to FIG. 2, a path determination unit 212, an obstacle sensor 214 and a parallax information generation unit 216 are illustrated.

The path determination unit 212 determines the first path by using the starting point and the destination of the unmanned ground vehicle and determines the second path avoiding the obstacle by using the parallax information.

The obstacle sensor 214 generates the obstacle position signal, which is produced by detecting the obstacle during an operation of the vehicle. Multiple obstacle sensors 214 can be mounted on a surface area of the unmanned ground vehicle, and particularly can be positioned on the vertex thereof (for example, when the vehicle is of a rectangular shape, each edge).

The parallax information generation unit 216 generates the parallax information by using the obstacle position signal and transmits the parallax information to the path determination unit 212.

The above steering method uses a model predictive approach for trajectory generation of unmanned ground vehicles (UGVs) combined with a tire model. An optimal tracking problem while avoiding collision with obstacles is formulated in terms of cost minimization under constraints. Information on obstacles is incorporated online in the nonlinear model predictive framework as the obstacles are sensed within a limited sensing range.

In this setting, trajectory computation is divided into a global path generation and a local path generation. The overall problem is solved in real-time with nonlinear programming. In order to regenerate the local path upon detecting new obstacles, a cost function is augmented using an obstacle information in two methods. A first method uses the distance from the UGV to a nearest detected obstacle, weighted with the speed of the vehicle. In the second method, the parallax information about the detected obstacle is used, with modification to incorporate the moving direction of the UGV. For performance comparison, computational efficiency, path length, energy consumption and terminal time are evaluated for each method. Simulation results in a cluttered environment show that the modified parallax method effectively reflects the threat of the obstacle to the UGV by considering a dimension and state variables of the vehicle, showing clear improvements over distance-based methods.

Before explaining preferable embodiments of the present invention in detail, descriptions of a non-linear unmanned ground vehicle model combined with a tire model, a basic model predictive control formulation and algorithm, and a framework for an overall path generation process will be given below.

Figure 3:
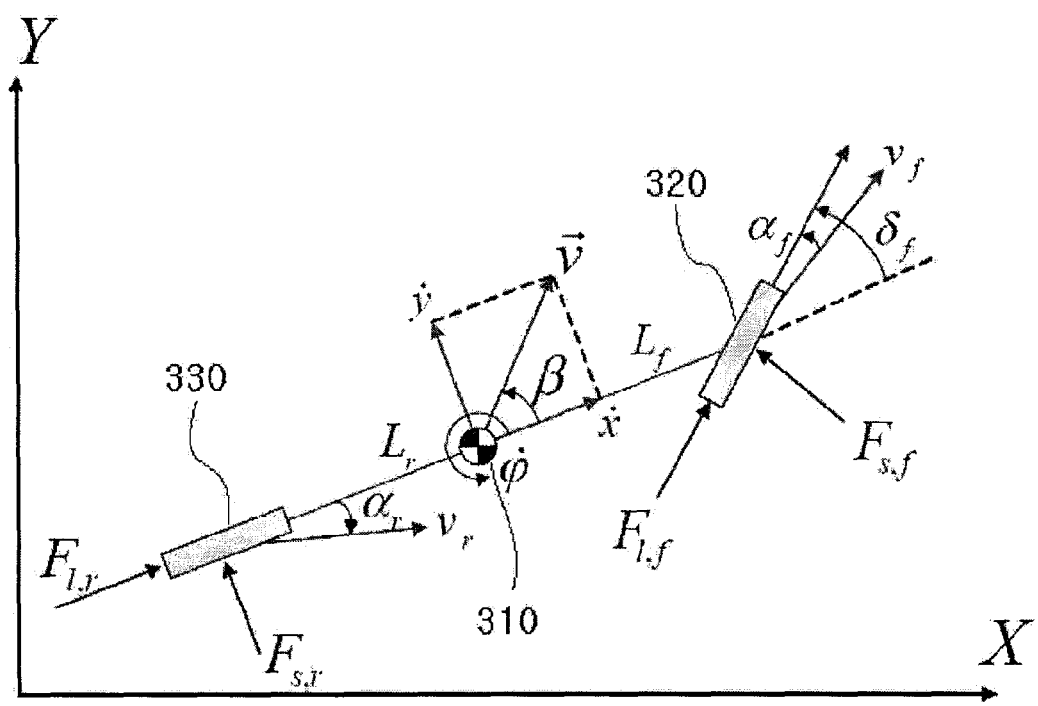
FIG. 3 is a dynamics diagram illustrating a bicycle model vehicle according to an example embodiment of the present invention.

With reference to FIG. 3, dynamics of a bicycle model is described.

The following subscripts are used for the variables throughout this specification:
- (•)f front wheel 320
- (•)r rear wheel 330
- (•)x x-axis of the robot's body coordinate frame
- (•)y y-axis of the robot's body coordinate frame
- (•) x-axis of the inertial reference frame
- (•)Y y-axis of the inertial reference frame
- (•)s side (lateral) direction
- (•)l longitudinal direction
- (•)k the kth time step
- (•)ref reference signals For outdoor applications, four-wheel models are often preferable to unicycles, because of the better stability in the posture. Here, a bicycle model simplified from a four-wheel model is considered in combination with the tire model. In this bicycle model, the motion of the vehicle is a function of the forces Fx, Fy, and momentum Mz exerted on the center of gravity (CG) 310 of the UGV.

Eq. (1) describes the dynamics of the vehicle, where m and Izz are the mass and the inertia moment of the vehicle, respectively. As shown in FIG. 3, $\beta$ is the direction of the velocity with respect to the x-axis of the vehicle's body coordinate frame whose origin coincides with the CG of the vehicle. $\phi$ is the yaw angle in the inertial frame v and is the speed of the CG of the vehicle.

$$mv(\dot{\beta}+\dot{\phi})=-F_x \sin\beta + F_y \cos\beta,$$

$$m\dot{v}=F_x \cos\beta + F_y \sin\beta,$$

$$I_{zz}\ddot{\phi}=M_z \quad (1)$$

Setting up equations for the equilibrium of forces and momentum in FIG. 3 yields the geometric relation of Eq. (2), where $\delta_f$ is the front steering angle. $F_{sf}$, $F_{sr}$, $F_{lf}$ and $F_{lr}$ are side and longitudinal tire forces exerted on each tire. $L_f$ and $L_r$ are lengths from the CG 310 of the vehicle to the front and rear wheels, respectively.

$$\begin{bmatrix} F_x \\ F_y \\ M_z \end{bmatrix} = \begin{bmatrix} -\sin\delta_f & 0 \\ \cos\delta_f & 1 \\ L_f\cos\delta_f & -L_r \end{bmatrix}\begin{bmatrix} 2F_{sf} \\ 2F_{sr} \end{bmatrix} + \begin{bmatrix} \cos\delta_f & 1 \\ \sin\delta_f & 0 \\ L_f\sin\delta_f & 0 \end{bmatrix}\begin{bmatrix} 2F_{lf} \\ 2F_{lr} \end{bmatrix} \quad (2)$$

Longitudinal and side tire forces for each tire are given as nonlinear functions of the slip angle ($\alpha$), the slip ratio (S), the road friction coefficient ($\mu$), and the total vertical load $F_z$.

$$F_l = f_l(\alpha, s, \mu, F_z)$$

$$F_s = f_s(\alpha, s, \mu, F_z) \quad (3)$$

where the slip ratio s is defined as $$s = \begin{cases} \dfrac{rw}{v_l} - 1, & \text{if } v_l > rw, v_l \neq 0 \text{ for breaking,} \\ 1 - \dfrac{v_l}{rw}, & \text{if } v_l < rw, w \neq 0 \text{ for driving} \end{cases} \quad (4)$$

$v_l$ is the longitudinal velocity of the center of the tire, r is the effective radius of the tire, and w is the angular velocity of the tire. And the front and rear tire slip angles $\alpha_f$, $\alpha_r$ are the functions of $\beta$, $\dot{\phi}$, v as Eq. (5):

$$\alpha_f = \delta_f - \tan^{-1}\left(\frac{v\sin\beta + L_f\dot{\phi}}{v\cos\beta}\right),$$

$$\alpha_r = -\tan^{-1}\left(\frac{v\sin\beta - L_f\dot{\phi}}{v\cos\beta}\right). \quad (5)$$

The vertical load $F_z$ is distributed between the front and rear wheels depending on the geometry of the vehicle:

$$F_{zf} = \frac{L_r mg}{2(L_f + L_r)},$$

$$F_{zr} = \frac{L_f mg}{2(L_f + L_r)} \quad (6)$$

The motion of the CG 310 of the vehicle in the inertial frame is described by $$\dot{X}_{CG} = v\cos\beta\cos\phi - v\sin\beta\sin\phi,$$

$$\dot{Y}_{CG} = v\cos\beta\sin\phi + v\sin\beta\cos\phi \quad (7)$$

For the tire forces in Eq. (3), the tire model described by a Pacejka's MAGIC formula (Bakker et al. (1987)) are used herein. This model represents a complex semi-empirical relationship, which takes into consideration the interaction between the longitudinal tire force and the lateral tire force in combined braking and steering conditions.

In consideration of the longitudinal tire force with respect to the slip ratio s and the lateral tire force corresponding to the front-wheel slip angle $\alpha_f$ with different levels of $F_z$, within ±2 slip angle, the nonlinear and linear side tire model essentially agree with each other. Thus, instead of the nonlinear lateral tire model, the following straight-line approximations can be used, within the restricted range of slip angle:

$$F_{sf}(\alpha_f) = C_{\alpha f}\alpha_f, \quad F_{sr}(\alpha_r) = C_{\alpha r}\alpha_r, \quad |\alpha_f|, |\alpha_r| \leq 2° \quad (8)$$

In order to reflect the dynamic characteristics of the UGV using a computationally efficient model, the following simplifications have been made to the nonlinear bicycle model:
1) $\beta \ll 1 \Rightarrow \sin\beta \approx \beta$, $\cos\beta \approx 1$
2) $\dot{v}=0$ and $F_l=0 \Rightarrow F_x=0$
3) $\delta_f \ll 1 \Rightarrow \sin\delta_f \approx \delta_f$, $\cos\delta_f \approx 1$ Then Eq. (1) can be simplified into Eq. (9).

$$mv(\dot{\beta}+\dot{\phi})=F_y,$$

$$I_{zz}\ddot{\phi}=M_z \quad (9)$$

With the above assumptions, Eqs. (2), (5) and (7) can be written as Eqs. (10), (11) and (12), respectively:

$$\begin{bmatrix} F_x \\ F_y \\ M_z \end{bmatrix} = \begin{bmatrix} -\delta_f & 0 \\ 1 & 1 \\ L_f & -L_r \end{bmatrix}\begin{bmatrix} 2F_{sf} \\ 2F_{sr} \end{bmatrix} + \begin{bmatrix} 1 & 1 \\ \delta_f & 0 \\ L_f\delta_f & 0 \end{bmatrix}\begin{bmatrix} 2F_{lf} \\ 2F_{lr} \end{bmatrix} \quad (10)$$

$$\alpha_f = \delta_f - \beta - \frac{L_f\dot{\phi}}{v}, \quad (11)$$

$$\alpha_r = -\beta + \frac{L_r\dot{\phi}}{v}.$$

$$\dot{X}_{CG} = v\cos\phi - v\beta\sin\phi, \quad (12)$$

$$\dot{Y}_{CG} = v\sin\phi + v\beta\cos\phi.$$

Then, the following partially-nonlinear affine model can be established from Eqs. (8)-(12):

$$\dot{\xi} = f(\xi, u) \quad (13)$$

$$= \begin{bmatrix} \dot{\beta} \\ \dot{\varphi} \\ \ddot{\varphi} \\ \dot{\delta}_f \\ \dot{X}_{CG} \\ \dot{Y}_{CG} \end{bmatrix}$$

$$= \begin{bmatrix} \left(-\frac{2(C_{\alpha f}+C_{\alpha r})}{mv}\right)\beta + \left(-1 + \frac{2(C_{\alpha r}L_r - C_{\alpha f}L_f)}{mv^2}\right)\varphi + \\ \left(\frac{2C_{\alpha f}}{I_{zz}}\right)\delta_f \\ \dot{\varphi} \\ \left(\frac{2(C_{\alpha r}L_r - C_{\alpha f}L_f)}{I_{zz}}\right)\beta + \left(-\frac{2(C_{\alpha r}L_r^2 + C_{\alpha f}L_f^2)}{I_{zz}v}\right)\varphi + \\ \left(\frac{2C_{\alpha f}L_f}{I_{zz}}\right)\delta_f \\ u \\ v\cos\varphi - v\beta\sin\varphi \\ v\sin\varphi + v\beta\cos\varphi \end{bmatrix},$$

$$\eta = h(\xi)$$
$$= C\xi$$
$$= \begin{bmatrix} X_{CG} \\ Y_{CG} \end{bmatrix}$$

where the state and control input vectors are $\xi = [\beta, \varphi, \dot{\varphi}, \delta_f, X_{CG}, Y_{CG}]^T$ and $u = \dot{\delta}_f$, respectively. And the output vector $\eta$ is the location of the CG 310 of the UGV in the inertial frame.

For validation, the simplified model (Eq. (13)) was compared with the fully nonlinear bicycle model (Eqs. (1)~(7)) combined with the nonlinear lateral tire model. During the initial 5 seconds, the front steering angle of 3 degrees has been applied and during the remaining 5 seconds, the front steering angle of −3 degrees is applied for pure and partial nonlinear bicycle model with identical initial velocity.

In spite of the different lateral tire forces when the command change, which are attributed to the linearized tire model, their corresponding trajectories are similar with a proper tuning of proportional coefficients ($C_{\alpha f}$, $C_{\alpha r}$).

For discrete-time domain implementation, the UGV dynamic equations of Eq. (13) are discretized as Eq. (14):

$$\xi_{k+1} = f^{dt}(\xi_k, u_k),$$

$$\eta_{k+1} = h(\xi_k). \quad (14)$$

Model predictive control is to compute the optimal control input sequence with the receding horizon principle at each time step t, which minimizes the cost function subject to equality and inequality constraints as the following:

$$[u_{k,t}^*]_{k=0}^{N-1} = \text{argmin}(J(\xi_t, u_t)) \quad (15)$$

$$h(\xi_{k,t}, u_{k,t}) = \xi_{k+1,t} - f^{dt}(\xi_{k,t}, u_{k,t}) = 0 \quad (16)$$

$$g_u(u_{k,t}) = |u_{k,t}| - u_{sat} \le 0 \quad (17)$$

$$g_{\delta_f}(\delta_{f,k,t}) = |\delta_{f,k,t}| - \delta_{f,sat} \le 0 \quad (18)$$

$$g_{\alpha_f}(\alpha_{f,k,t}) = |\alpha_{f,k,t}| - \alpha_{f,sat} \le 0 \quad (19)$$

$$g_{\alpha_r}(\alpha_{r,k,t}) = |\alpha_{r,k,t}| - \alpha_{r,sat} \le 0 \quad (20)$$

where $k = 0, \ldots, N-1$.

Here t is the current time instant, N is the length of the look-ahead horizon, k is the time step within the look-ahead horizon and a subscript sat indicates a saturation constraint.

Eq. (16) is the equality condition meaning the UGV dynamics. Eqs. (17) and (18) reflect the limit on u and $\delta_f$. Eqs. (19) and (20) are for the linearized lateral tire model. Cost function for tracking is considered as the following:

$$J(\xi_t, u_t) = \phi(\tilde{\eta}_{N,t}) + \sum_{k=0}^{N-1} L(\tilde{\eta}_{k,t}, u_{k,t}) \quad (21)$$

$$\phi(\tilde{\eta}_{N,t}) = \frac{1}{2}\tilde{\eta}_{N,t}^T P \tilde{\eta}_{N,t} \quad (22)$$

$$L(\tilde{\eta}_{k,t}, u_{k,t}) = \frac{1}{2}\tilde{\eta}_{k,t}^T Q \tilde{\eta}_{k,t} + \frac{1}{2}u_{k,t}^T R u_{k,t} \quad (23)$$

$\tilde{\eta}_{k,t}$ is defined as $\tilde{\eta}_{k,t} = \eta_{k,t,ref} - \eta_{k,t}$ where $\eta_{k,t,ref}$ is the reference trajectory planned offline. P, Q and R are constant weighting matrices.

Eq. (22) penalizes the deviation at the final stage. The first term of Eq. (23) is the penalty on the deviation from the desired reference, and the second term penalizes the large control signal in the view of the minimal energy consumption.

The equality and inequality constraints are incorporated into the augmented cost function as the following:

$$J_{aug}(\xi_t, u_t) = \phi(\tilde{\eta}_{N,t}) + \sum_{k=0}^{N-1} L(\tilde{\eta}_{k,t}, u_{k,t}) + \lambda_k h(\xi_{k,t}, u_{k,t}) + \\ \mu_u G_u(u_{k,t}) + \mu_{\delta_f} G_{\delta_f}(\delta_{f,k,t}) + \mu_{\alpha_f} G_{\alpha_f}(\alpha_{f,k,t}) + \mu_{\alpha_r} G_{\alpha_r}(\alpha_{r,k,t}) \quad (24)$$

where $\lambda_k$ is Lagrange multiplier, $\mu_u$, $\mu_{\delta_f}$, $\mu_{\alpha_f}$, $\mu_{\alpha_r}$ are KKT (Karush-Kuhn-Tucker) variables representing weighting parameters for the saturation constraints. From Eqs. (17) to (20), $G_u$, $G_{\delta_f}$, $G_{\alpha_f}$, $G_{\alpha_r}$ are determined as:

$$G_u(u_{k,t}) = \begin{cases} \frac{1}{2}g_u(u_{k,t})^2, & \text{if } g_u(u_{k,t}) > 0 \\ 0, & \text{if } g_u(u_{k,t}) \le 0 \end{cases} \quad (25)$$

$$G_{\delta_f}(\delta_{f,k,t}) = \begin{cases} \frac{1}{2}g_{\delta_f}(\delta_{f,k,t})^2, & \text{if } g_{\delta_f}(\delta_{f,k,t}) > 0 \\ 0, & \text{if } g_{\delta_f}(\delta_{f,k,t}) \le 0 \end{cases} \quad (26)$$

$$G_{\alpha_f}(\alpha_{f,k,t}) = \begin{cases} \frac{1}{2}g_{\alpha_f}(\alpha_{f,k,t})^2, & \text{if } g_{\alpha_f}(\alpha_{f,k,t}) > 0 \\ 0, & \text{if } g_{\alpha_f}(\alpha_{f,k,t}) \le 0 \end{cases} \quad (27)$$

$$G_{\alpha_r}(\alpha_{r,k,t}) = \begin{cases} \frac{1}{2}g_{\alpha_r}(\alpha_{r,k,t})^2, & \text{if } g_{\alpha_r}(\alpha_{r,k,t}) > 0 \\ 0, & \text{if } g_{\alpha_r}(\alpha_{r,k,t}) \le 0 \end{cases} \quad (28)$$

With the augmented cost function (Eqs. (24) to (28)), the online optimization is performed using the gradient search.

It is assumed that UGVs can estimate their own state variables, control input commands and output variables precisely. In unknown environments, UGVs have very limited information containing only the start and goal location but not the location of obstacles. In this situation, UGVs are demanded to navigate from the start to its goal without any collision using sensor data only.

The present invention is primarily interested in steering only, so the range sensors attached in the front, left and the right sides of the UGV are used. Obstacles located in this area are recognized with binary information.

Trajectory generation procedure may consist of global (or first) and local (or second) path planning.

Initially, the UGV starts with a known goal and start location, and generates the global trajectory off-line. Additional cost function terms incorporated into the Eq. (24) for the global path computation process will be presented. On the way to the goal point, sensor data will change upon detecting obstacles, and with this information, the UGV regenerates a local trajectory avoiding obstacles online. For this process, additional cost function terms for the local path computation will be presented.

For tracking in known environments, reference trajectories are often expressed as functions of time. In our setting, only active steering at a constant speed is available, therefore, using a fixed function of time as a global reference path is not preferable because deviation from that reference trajectory can be accumulated due to the appearance of obstacles unknown a priori.

For this reason, the reference trajectory at time t, $\eta_{k,t,ref}$ is constructed as the following straight line connecting the start location $[X_{CG,0,0}, Y_{CG,0,0}]$ 410 and the destination $[X_{CG,f}, Y_{CG,f}]$ 420:

$$\eta_{k,t,ref} = [X_{CG,k,t,ref} Y_{CG,k,t,ref}] \quad (29)$$

$$Y_{CG,k,t} = \tan(\phi_{ref})(X_{CG,k,t} - X_{CG,0,0}) + Y_{CG,0,0} \quad (30)$$

Figure 4:
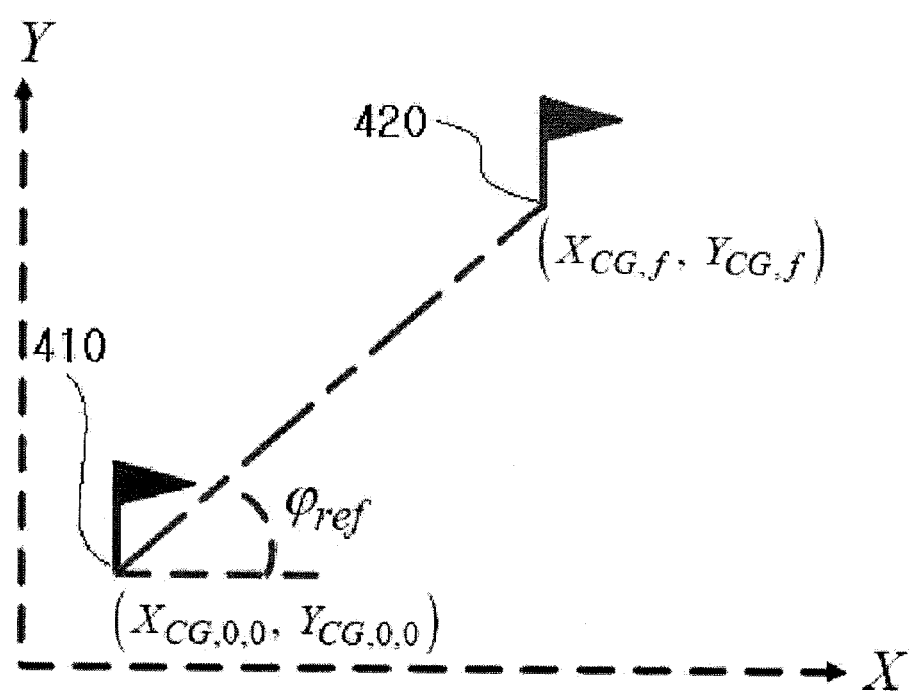
FIG. 4 illustrates a reference trajectory of a vehicle according to an example embodiment of the present invention.

$\phi_{ref}$ is the reference heading angle of the vehicle as shown in FIG. 4 and at each time step, $X_{CG,k,t,ref}$ is obtained as the X-coordinate of the point on the straight line nearest from the current position $q_{CG,k,t} = [X_{CG,k,t}, Y_{CG,k,t}]^T$. In order to promote the UGV to advance toward the destination rather than retreating due to the hazard, the following term is added to Eq. (24):

$$PF_{goal,k,t} = \frac{1}{2} K_{goal} d_{goal,k,t}^2 \quad (31)$$

$$d_{goal,k,t} = \|q_{CG,k,t} - q_{goal}\|$$

$$q_{CG,k,t} = [X_{CG,k,t}, Y_{CG,k,t}]^T$$

$$q_{goal} = [X_{CG,f}, Y_{CG,f}]^T$$

where, $K_{goal}$ is the weighting parameter. The difference of this approach and the traditional potential field approaches lies in the optimization in the receding horizon framework. This fact will result in the large differences in the overall performances, as will be seen bellow.

To regenerate the safe trajectory using the sensor information of a limited range, Eq. (24) may be adjusted in the local path replanning stage. UGV dynamics are nonholonomic, and in cramped environments like urban areas, the dimensions of UGVs are critical issues. Besides, the obstacle avoidance using the limited-range sensor becomes more difficult at high vehicle speed. For these reasons, treating the vehicle as a point and using only the distance between the CG of the vehicle and the obstacles may not yield a good solution.

This section presents two approaches for local obstacle avoidance. In the first approach, the minimum distance between the vehicle and obstacles is used, weighted with the vehicle speed. In the second approach, consideration of the dimension of the vehicle is made by a clever use of parallax information.

In this distance-based approach, the potential-like cost functions using the information of the distance to the detected obstacles from the vehicle are constructed and added to Eq. (24) to generate the repulsive field from the obstacles.

Figure 5:
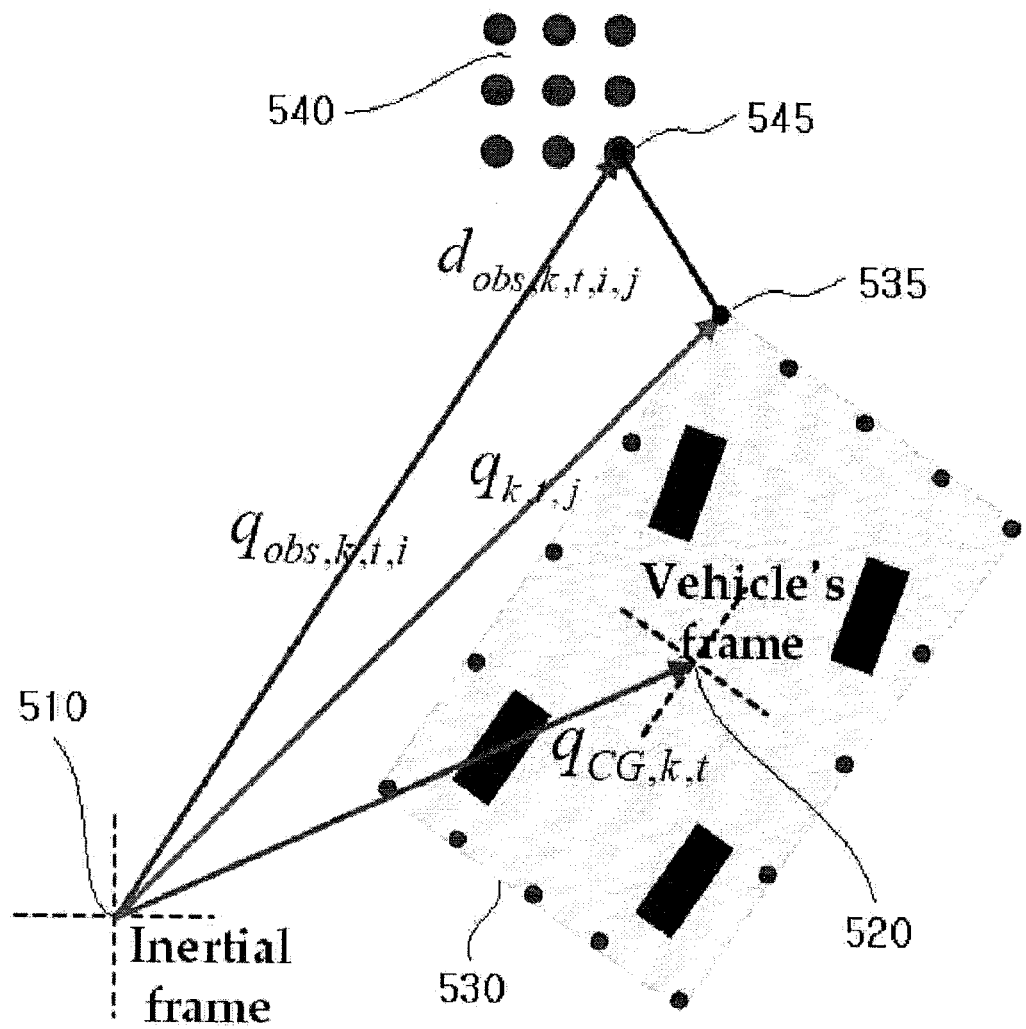
FIG. 5 illustrates a distance between a vehicle and an obstacle according to an example embodiment of the present invention.

Suppose that at time (k, t), the vehicle is located at $q_{CG,k,t} = [X_{CG,k,t}, Y_{CG,k,t}]$, Among the sensors 535 mounted around the vehicle 530 and the obstacles 540, 545 detected within the sensor range, $d_{obs,k,t,i,j}$ is the distance between the jth sensor spot around the UGV 530 and ith detected obstacle 540 at time (k, t), as shown in FIG. 5.

As an extension of the traditional approach, consideration of the speed of UGV 530 is also made as the following form:

$$PF_{obs,k,t} = K_{obs} \frac{d_c}{\min_{i,j}(d_{obs,k,t,i,j}) + \epsilon} \quad (32)$$

$$d_{obs,k,t,i,j} = \|q_{k,t,j} - q_{obs,k,t,i}\|$$

$$d_c = K_{safe} \upsilon$$

where, $K_{obs}$ and $K_{safe}$ are weighting parameters, $d_c$ is the critical distance defined with respect to the speed of UGV 530, and $\epsilon$ is a small positive constant for non-singularity.

Eq. (32) contains information of the $\phi_{k,t}, X_{CG,k,t}$ and $Y_{CG,k,t}$ among the state variables. Note that, although dimension of the vehicle is considered, this approach contains the current heading angle, rather than the actual moving direction of the vehicle.

Figure 6:
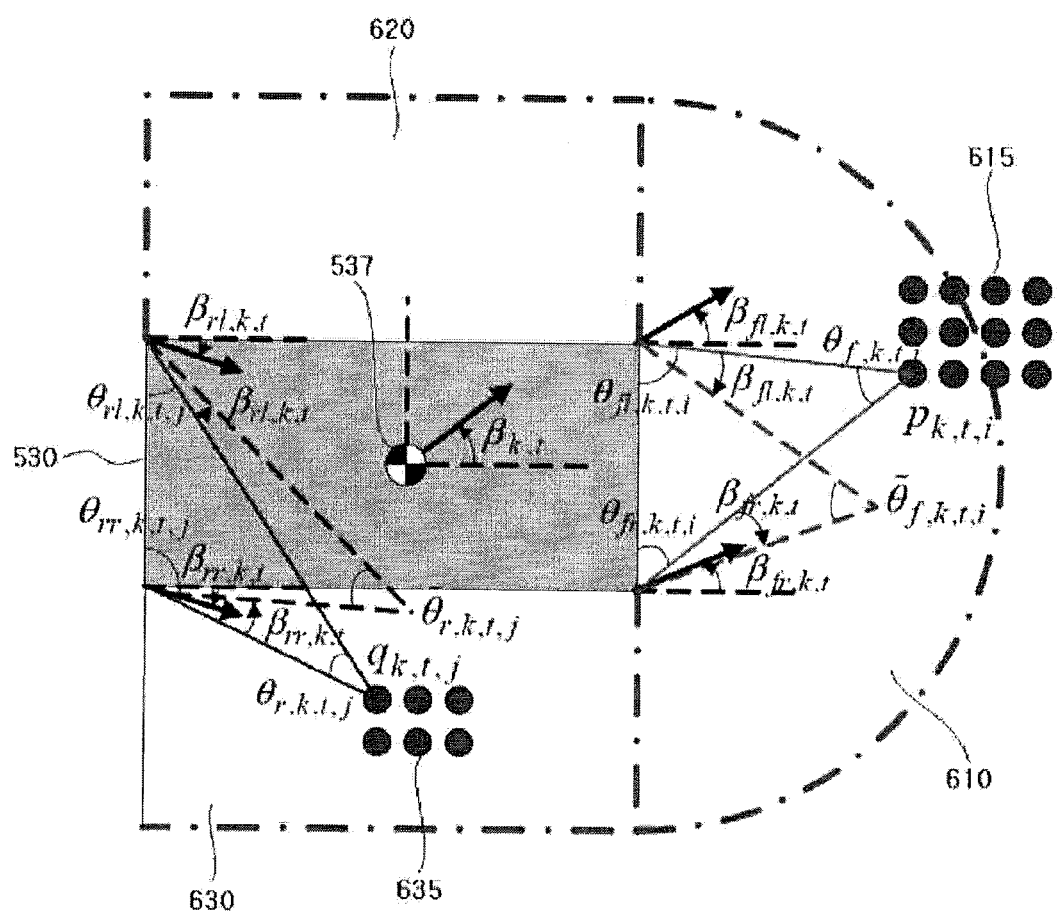
FIG. 6 illustrates a modified parallax between a vehicle and an obstacle according to an example embodiment of the present invention.

FIG. 6 illustrates a modified parallax between a vehicle and an obstacle according to an example embodiment of the present invention. FIG. 6 illustrates a center of gravity of UGV 537, forwarding sensing range of UGV 610, left side sensing range of UGV 620, right side sensing range of UGV 630, forwarding obstacle 615 and side obstacle 635.

Suppose that the obstacle i and j are detected within the forward and side sensing range 610, 630 at time (k, t), respectively, and their coordinates are $[p_{X,k,t,i}, p_{Y,k,t,i}]$ and $[q_{X,k,t,j}, q_{Y,k,t,j}]$. Then, $(p_{x,k,t,i})$ and $(q_{x,k,t,j}, q_{y,k,t,j})$ the coordinates of the ith obstacle detected in the front sensing range and the jth obstacle in the side sensing range, respectively, are determined in the vehicle coordinate frame as the following:

$$p_{x,k,t,i} = (p_{X,k,t,i} - X_{CG,k,t})\cos\phi_{k,t} + (p_{Y,k,t,i} - Y_{CG,k,t})\sin\phi_{k,t}$$

$$p_{y,k,t,i} = (p_{Y,k,t,i} - X_{CG,k,t})\cos\phi_{k,t} + (p_{X,k,t,i} - X_{CG,k,t})\sin\phi_{k,t}$$

$$q_{x,k,t,j} = (q_{X,k,t,j} - X_{CG,k,t})\cos\phi_{k,t} + (q_{Y,k,t,j} - Y_{CG,k,t})\sin\phi_{k,t}$$

$$q_{y,k,t,j} = (q_{X,k,t,j} - X_{CG,k,t})\cos\phi_{k,t} + (q_{X,k,t,j} - X_{CG,k,t})\sin\phi_{k,t}$$

Now, as shown in FIG. 6, suppose that $\theta_{fl,k,t,i}, \theta_{fr,k,t,i}, \theta_{rl,k,t,j}$, and $\theta_{rr,k,t,j}$ denote the angles between the front and rear faces and the line of sight toward the obstacles at each vertex. And let $\beta_{fl,k,t}, \beta_{fr,k,t}, \beta_{rl,k,t}$ and $\beta_{rr,k,t}$ denote the moving direction of four vertices of the UGV. They can be calculated as the following relationship:

$$\theta_{fl,k,t,i} = \tan^{-1}\frac{p_{x,k,t,i} - \frac{L}{2}}{\frac{W}{2} - p_{y,k,t,i}}, \theta_{fr,k,t,i} = \tan^{-1}\frac{p_{x,k,t,i} - \frac{L}{2}}{\frac{W}{2} + p_{y,k,t,i}}$$

$$\theta_{rl,k,t,j} = \tan^{-1}\frac{q_{x,k,t,j} + \frac{L}{2}}{\frac{W}{2} - q_{y,k,t,j}}, \theta_{rr,k,t,j} = \tan^{-1}\frac{q_{x,k,t,j} + \frac{L}{2}}{\frac{W}{2} + q_{y,k,t,j}}$$

-continued $$\beta_{fl,k,t} = \tan^{-1}\frac{v\sin\beta_{k,t} + \frac{L}{2}\dot{\varphi}_{k,t}}{v\cos\beta_{k,t} - \frac{W}{2}\dot{\varphi}_{k,t}}, \beta_{fr,k,t} = \tan^{-1}\frac{v\sin\beta_{k,t} + \frac{L}{2}\dot{\varphi}_{k,t}}{v\cos\beta_{k,t} + \frac{W}{2}\dot{\varphi}_{k,t}}$$

$$\beta_{rl,k,t} = \tan^{-1}\frac{v\sin\beta_{k,t} - \frac{L}{2}\dot{\varphi}_{k,t}}{v\cos\beta_{k,t} - \frac{W}{2}\dot{\varphi}_{k,t}}, \beta_{rr,k,t} = \tan^{-1}\frac{v\sin\beta_{k,t} - \frac{L}{2}\dot{\varphi}_{k,t}}{v\cos\beta_{k,t} + \frac{W}{2}\dot{\varphi}_{k,t}}$$

Then, modified Parallax (MP), defined as the following, incorporates the moving direction of four vertices of the UGV:

$$MP_{k,t,i,j} := \begin{cases} \tilde{\theta}_{f,k,t,i} = \pi - [(\theta_{fl,k,t,i} - \beta_{fl,k,t}) + (\theta_{fr,k,t,i} + \beta_{fr,k,t})], \\ \tilde{\theta}_{r,k,t,i} = \pi - [(\theta_{rl,k,t,j} - \beta_{rl,k,t}) + (\theta_{rr,k,t,j} + \beta_{rr,k,t})] \end{cases} \quad (33)$$

Then with $\tilde{\theta}_{f,k,t,i}$ and $\tilde{\theta}_{r,k,t,j}$ computed by Eq. (33), the following potential-like cost function can be constructed.

$$PF_{obs,k,t,i,j} = \begin{cases} 0, & (34) \\ \text{no obstacle exists in the sensing range,} \\ \max_i K_{obs}\exp\left(\frac{\tilde{\theta}_{f,k,t,i}}{\theta_{f,c(v)}}\right), \\ p_{k,t,i} \text{ exists in the sensing range,} \\ \max_i K_{obs}\exp\left(\frac{\tilde{\theta}_{r,k,t,j}}{\theta_{r,c(v)}}\right), \\ q_{k,t,j} \text{ exists in the sensing range,} \\ \max_{i,j} K_{obs}\exp\left(\frac{\tilde{\theta}_{f,k,t,i}}{\theta_{f,c(v)}} + \frac{\tilde{\theta}_{r,k,t,j}}{\theta_{r,c(v)}}\right), \\ p_{k,t,i} \text{ and } q_{k,t,j} \text{ exist in the sensing range,} \end{cases}$$

where $\theta_{f,c}$ and $\theta_{r,c}$ are the critical modified parallax values defined as, $$\theta_{f,c} = \frac{K_{MP,f}}{v}, \quad \theta_{r,c} = \frac{K_{MP,r}}{v} \quad (35)$$

where $K_{MP,f}$ and $K_{MP,r}$ are weighting values. Eq. (35) reflects the difficulty to turn at a higher speed in formulating the degree of threat. Eq. (34) penalize the higher MP values.

Even when two obstacles are located in the identical parallax, the modification using Eq. (34) allows to reflect different levels of threat with respect to the actual moving direction of four vertices of the UGV. Moreover, Eq. (34) contains rich information about state variables ($\beta$, $\varphi$, $\dot{\varphi}$ and the CG location).

To test the performance of the proposed approaches, numerical simulations are performed using the setting given in Table. 1. Navigation in a rather simple environment and a more cluttered environment are considered as a trajectory space below.

The performance of the proposed model predictive framework is compared with the potential field approach using the following performance metric:

Trajectory Length $$L_t := \Sigma_{t=0}^{t_f}\|[X_{CG,t+\Delta t}, Y_{CG,t+\Delta t}] - [X_{CG,t}, Y_{CG,t}]\|_2$$

Energy Consumption $$E := \Sigma_{t=0}^{t_f}u_t^2 \quad (36)$$

Where $L_t$ is trajectory length, E is energy consumption, $t_f$ denotes the terminal time at which the UGV arrives at the goal. In all plots of trajectories, the green dashed line connecting the start and the goal locations represents the global reference trajectories planned off-line.

TABLE 1

| Numerical setting | |
|---|---|
| horizon length(N) | 40 |
| sampling time ($\Delta t$) | 0.05 sec |
| speed (v) | 3 m/s |
| control command limit | $-60°/\text{sec} \leq u \leq 60°/\text{sec}$ |
| steering angle limit | $-30° \leq \delta_f \leq 30°$ |
| slip angle of a tire limit | $-2° \leq \alpha_f, \alpha_r \leq 2°$ |
| UGV specification | m = 807 kg, $I_{zz}$ = 429.649 kg m$^2$ |
| UGV dimension | 1.290 m(W) × 2.150 m(L) |
| Axle length | $L_r$ = 0.835 m, $L_f$ = 0.715 m |
| the front sensing range | semicircle with (5 m + w/2) radius |
| the each side sensing range | rectangle (Length = $L_s$, Width = 5 m) |
| initial state variables | $\xi_0 = [0, \pi/2, 0, 0, 5, 5]^T$ |

Figure 7:
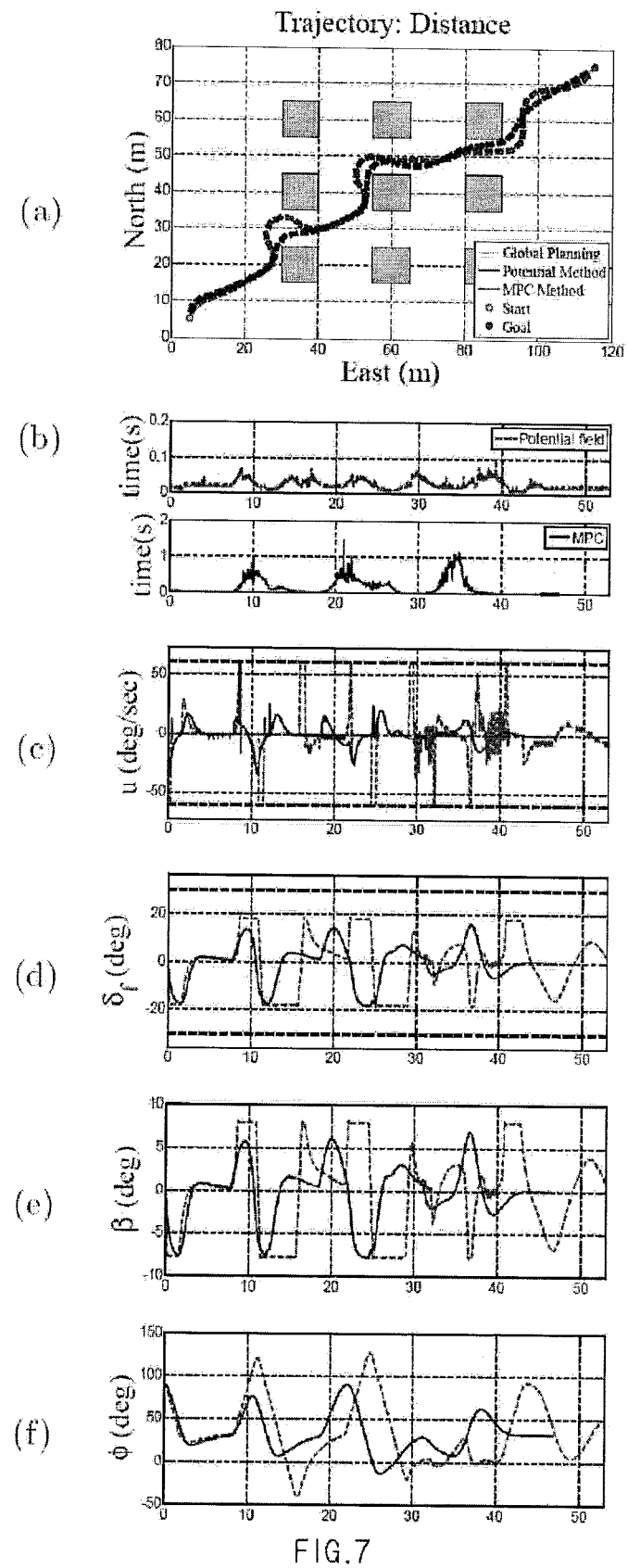
FIG. 7 illustrates a first numerical simulation result according to an example embodiment of the present invention.
Figure 8:
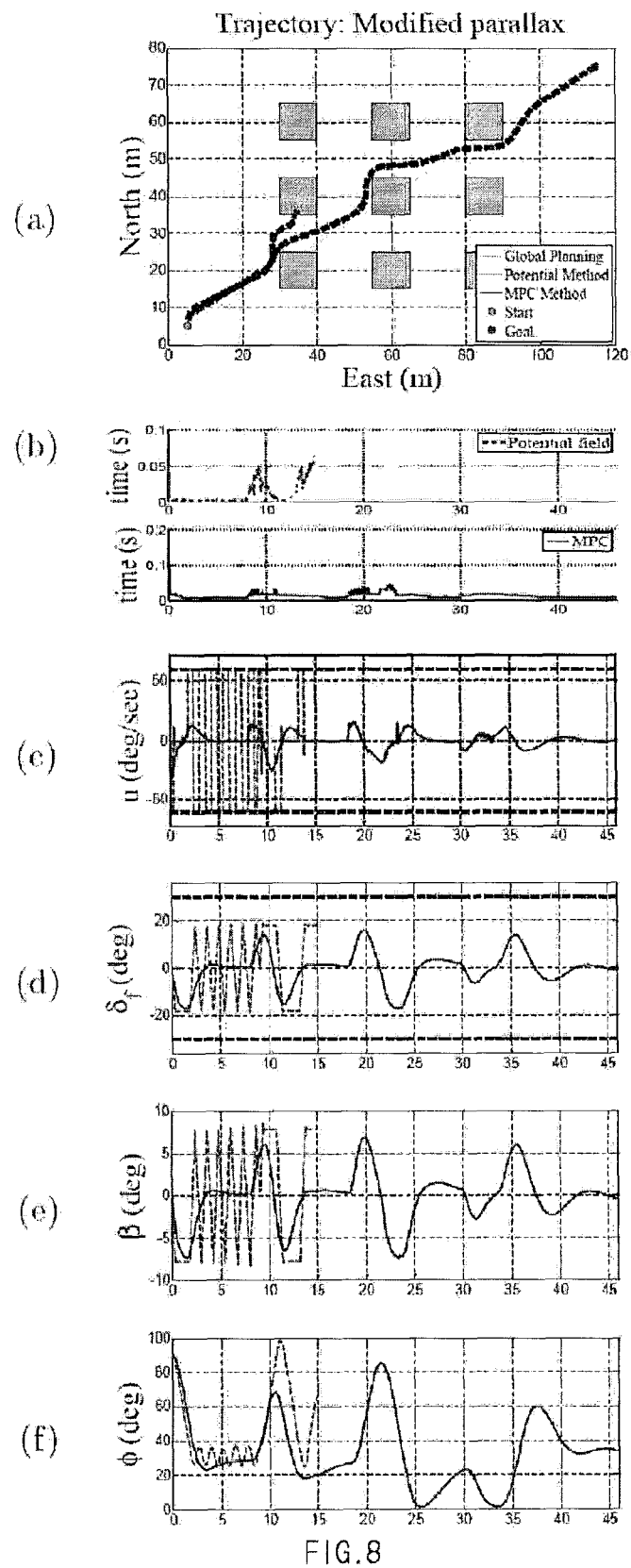
FIG. 8 illustrates a second numerical simulation result according to an example embodiment of the present invention.
Figure 9:
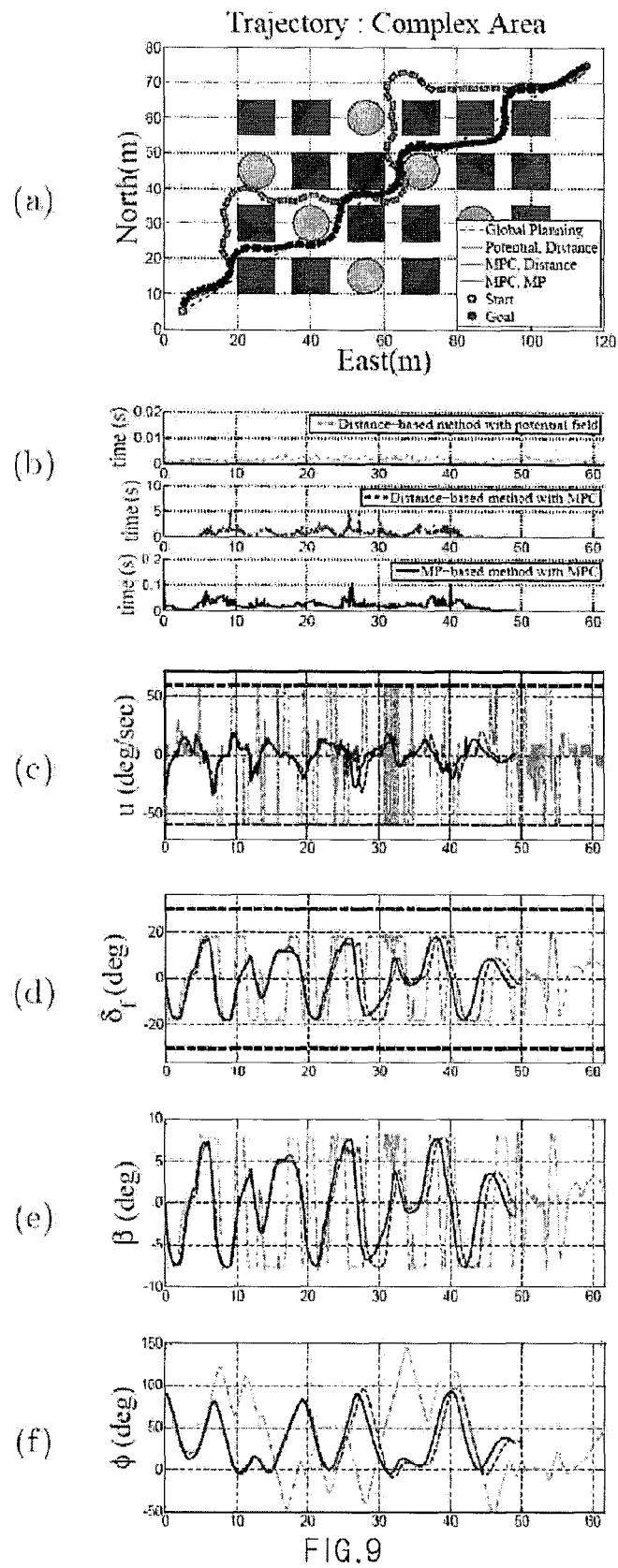
FIG. 9 illustrates a third numerical simulation result according to an example embodiment of the present invention.

FIGS. 7, 8 and 9 illustrate numerical simulation results according to an example embodiment of the present invention.

In this scenario shown in FIGS. 7 and 8, the space between the blocks is 10 m, which is comfortable for the UGV to navigate through. The distance- and modified-parallax (MP)-based methods in Eqs. (32) and (34) are implemented, using both the model predictive control (MPC) approach and the standard potential field approach, respectively.

FIG. 7 shows the results of weighted-distance-based methods implemented in the MPC and potential-field framework. The blue solid curves are the results of the MPC framework, which incorporated Eq. (32) into Eq. (24). The red dashed curves in all plots are those of the potential field approach, which uses Eq. (32) as a potential function. FIG. 7 shows navigation using the weighted distance method, (a) resulting trajectories, (b) computation time (upper: potential field approach, lower: MPC approach), (c) control input commands, (d) front steering angle, (e) slip angle of the CG, and (f) yaw angle. (In all plots, the red dashed curve: potential field approach, the blue solid curve: MPC approach.) In (c) and (d), black dashed lines are the saturation values.

FIG. 8 shows the results of MP-based method which Eq. (34) is implemented into Eq. (24) for the UGV whose dimension is considered. FIG. 8 shows navigation using the MP method, (a) resulting trajectories, (b) computation time (upper: potential field approach, lower: MPC approach), (c) control input commands, (d) front steering angle, (e) slip angle of the CG, and (f) yaw angle. (In all plots, the red dashed curve: potential field approach, the blue solid curve: MPC approach.) In (c) and (d), black dashed lines are the saturation values.

In all cases except the MP-based method using potential field approach, successful collision-free trajectories are acquired, and u, $\delta_f$, $\alpha_f$, and $\alpha_r$ are kept within the given saturation values. The resulting performance indices are shown in Table 2.

| Index | $L_{t, dist}$ | $L_{t, Parallax}$ | $E_{dist}$ | $E_{Parallax}$ | $t_{f, dist}$ | $t_{f, Parallax}$ |
|---|---|---|---|---|---|---|
| PF | 159.47 m | failed | 99.70 | failed | 52.95 sec | failed |
| MPC | 140.66 m | 138.21 m | 18.54 | 15.43 | 46.80 sec | 46.00 sec |

Table 2 presents the performance comparison of total length of the trajectory, consumed energy and terminal time.

In FIG. 7(b), the distance-based method in the MPC approach requires much longer computation time than the potential function approach. However, the obtained trajectory is better in the MPC approach in terms of the length, control energy and terminal time, as shown in Table 2.

In modified parallax-based method with MPC approach, the results are satisfactory in the view of computational efficiency and smoothness of the generated trajectory. On the other hand, with parallax-based potential field approach, collision with obstacles happens.

In comparison between distance-based and MP-based method in the MPC setting, clear difference in the generated trajectories does not exist. But with the MP-based method, a shorter path with less energy consumption and shorter terminal time is obtained at much increased computational efficiency).

With Eq. (34), the penalty cost in local path regeneration depends on relative location between the vehicle and obstacles, instant heading and its rate and the actual moving direction of vertices of the vehicle. Although distance information from obstacles is not included directly, modified parallax values of Eq. (33) defined from the front and rear sides of the vehicle effectively expresses the degree of hazard and renders a safe path regeneration possible.

The proposed algorithms are tested in a more complicated environment and compared in the view of safeness and relative optimality hereinafter. An area containing polygonal and circular blocks is assumed. The space between the blocks is 5 m which is rather tight for the UGV. Also note the short sensing range compared with the vehicle speed.

Simulations were performed with the two different methods (weighted-distance based or modified-parallax-based) in the MPC approach. And the result of potential approach with distance-based method is compared.

FIG. 9 are the results of the three methods. FIG. 9 illustrates navigation using the dimension, (a) resulting trajectories, (b) computation time (the first part: distance-based method with potential field, the second part: distance-based method with MPC, the third part: MP-based method with MPC), (c) control input commands, (d) front steering angle, (e) slip angle of the CG, (f) yaw angle. (In all plots, the green dotted curve: Distance-based method with potential field, the red dashed curve: Distance-based method MPC, The blue solid curve: MP-based method with MPC.) In (b) and (c), black dashed lines are the saturation values.

The red and blue curves are the results of the distance-based and MP-based method with MPC approaches, respectively. And the green curve is the result of the distance-based potential field approach. For the MP-based method with MPC, there is no collision with the obstacles, but for the distance-based method, contact with the circular block centered at [70 m, 45 m] occurs in both MPC and potential field approaches. In all cases, the constraints are satisfied.

| Index | $L_{t, dist}$ | $L_{t, Parallax}$ | $E_{dist}$ | $E_{parallax}$ | $t_{dist}$ | $t_{parallax}$ |
|---|---|---|---|---|---|---|
| PF | 185.74 m | . | 361.43 | . | 61.55 sec | . |
| MPC | 150.81 m | 147.93 m | 33.13 | 30.93 | 50.10 sec | 49.15 sec |

Table 3. shows the resulting performance indices. Table 3 presents the performance comparison of total length of the trajectory, consumed energy and terminal time in complex environments.

In the potential field approach, the trajectory and performance indices are poor. In MPC approaches, the MP-based method is slightly better than the distance-based method. However, the advantage of the MP-based method over the distance-based method becomes more clear in terms of the computation load reduced by the factor of 50 (See FIG. 9(b)).

In simpler obstacle avoidance problems, conventional approaches may suffice, which consider the UGV as a point and apply a distance-based potential function. However, to avoid the local minima issues and consider the global objective in the local trajectory generation, some form of looking ahead is necessary.

Furthermore, in complex or tight environments, the dimension of the vehicle should be taken into account. MPC provides a convenient setting for local trajectory generation of the vehicles with complex dynamics, and especially, the MP-based method with MPC approach is much more effective than the distance-based MPC method in the computation time point of view. In the implementation point of view, the parallax angle about a detected obstacle can be estimated easily.

As was stated above, An optimal problem while avoiding obstacles was formulated in terms of cost minimization under constraints in the model predictive control (MPC) framework. It is solved with nonlinear programming and the constraints were incorporated in the augmented Lagrangian. The local path planning step uses the information about the obstacles, detected by the limited-range sensors mounted around the vehicle. For implementation of the local path regenerator, the distance-based method and parallax-based method were proposed, with velocity weighting.

In order to address the obstacle avoidance in complex environments, the dimension of the UGV is taken into account. With the potential field approach, rapid computation for trajectory regeneration is possible, but collision with obstacles can happen due to local minima and performance indices such as terminal time and energy consumption are poor. The results with the MPC approach show that the application of distance-based method may require too much computation load especially in complex environments.

On the other hand, the modified-parallax (MP)-based local path generator effectively utilizes rich information about UGV (including dimension, velocity and actual moving direction of the UGV), and it shows a high computational efficiency and optimal characteristics in path length, energy consumption, and terminal time. Thus, the proposed MP-MPC approach provides a good solution for real-time obstacle avoidance of autonomous ground vehicles in complex environments.

A detailed description of other technologies for a method and an apparatus for steering a vehicle according to an example embodiment of the present invention including common platform technology using a specific handling system, an embedded system and an O/S, interface standardization technology using communication protocols and I/O interfaces, and technology for standardizing components such as an actuator, a battery, a camera and a sensor will be omitted.

A method and an apparatus for steering a vehicle according to an example embodiment of the present invention may be stored in a recording media to be executed by a predetermined device, for example, an electronic system of the vehicle. The recording media may be a hard disk, a video tape, a magnetic or optical media such as CD, VCD or DVD.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of steering a vehicle in an apparatus for steering the vehicle, the method comprising:

(a) determining a first path by using a starting point and a destination of the vehicle;

(b) generating an obstacle position signal when a plurality of obstacle sensors mounted on the vehicle detect an obstacle during an operation of the vehicle;

(c) generating a parallax information using the obstacle position signal received from the plurality of the obstacle sensors; and (d) determining a second path avoiding the obstacle by using the parallax information, wherein the parallax information includes the following moving direction angles:

$$\beta_{fl,k,t} = \tan^{-1}\frac{v\sin\beta_{k,t}+\frac{L}{2}\dot\varphi_{k,t}}{v\cos\beta_{k,t}-\frac{W}{2}\dot\varphi_{k,t}}, \quad \beta_{fr,k,t} = \tan^{-1}\frac{v\sin\beta_{k,t}+\frac{L}{2}\dot\varphi_{k,t}}{v\cos\beta_{k,t}+\frac{W}{2}\dot\varphi_{k,t}},$$

$$\beta_{rl,k,t} = \tan^{-1}\frac{v\sin\beta_{k,t}-\frac{L}{2}\dot\varphi_{k,t}}{v\cos\beta_{k,t}-\frac{W}{2}\dot\varphi_{k,t}}, \quad \beta_{rr,k,t} = \tan^{-1}\frac{v\sin\beta_{k,t}-\frac{L}{2}\dot\varphi_{k,t}}{v\cos\beta_{k,t}+\frac{W}{2}\dot\varphi_{k,t}}.$$

wherein L is an axle length of the vehicle, W is a width of the vehicle, $\beta_{fl,k,t}$, $\beta_{fr,k,t}$, $\beta_{rl,k,t}$ and $\beta_{rr,k,t}$ are moving direction angles at four vertices of the vehicle, respectively, $\beta_{k,t}$ is a moving direction angle of the center of the gravity of the vehicle, $\phi_{k,t}$ is a yaw angle, v is a velocity of the vehicle.

2. The method according to claim 1, wherein the vehicle is an unmanned ground vehicle (UGV).

3. The method according to claim 1, wherein, in step (d), the second path is determined by using a model predictive approach.

4. The method according to claim 3, wherein the second path determined by the model predictive approach have variables that minimize a cost function, which is expressed in the following equation:

$$J(\xi_t, u_t) = \phi(\tilde\eta_{N,t}) + \sum_{k=0}^{N-1} L(\tilde\eta_{k,t}, u_{k,t})$$

wherein, $\xi_t$ is a state variable vector at a time t, $u_t$ is a control input vector, $$\phi(\tilde\eta_{N,t}) = \frac{1}{2}\tilde\eta_{N,t}^T P\tilde\eta_{N,t}, \quad L(\tilde\eta_{k,t}, u_{k,t}) = \frac{1}{2}\tilde\eta_{k,t}^T Q\tilde\eta_{k,t} + \frac{1}{2}u_{k,t}^T Ru_{k,t}$$

(P, Q and R are constant weighting matrices, N is a length of a look-ahead horizontal, $\tilde\eta_{k,t} = \eta_{k,t,ref} - \eta_{k,t}$, $\eta_{k,t,ref}$ is a coordinate of the first path, $\eta_{k,t}$ is a coordinate of a center of gravity of the vehicle in an inertial frame).

5. The method according to claim 4, wherein a parallax cost function is further included in a second term of the cost function so that the parallax information is used in determining the second path, the parallax cost function being expressed as follows:

$$PF_{obs,k,t,i,j} = \begin{cases} 0, & \text{no obstacle exists in the sensing range,} \\ \max_i K_{obs}\exp\left(\frac{\tilde\theta_{f,k,t,i}}{\theta_{f,c(v)}}\right), & p_{k,t,i} \text{ exists in the sensing range,} \\ \max_i K_{obs}\exp\left(\frac{\tilde\theta_{r,k,t,j}}{\theta_{r,c(v)}}\right), & q_{k,t,j} \text{ exists in the sensing range,} \\ \max_{i,j} K_{obs}\exp\left(\frac{\tilde\theta_{f,k,t,i}}{\theta_{f,c(v)}}+\frac{\tilde\theta_{r,k,t,j}}{\theta_{r,c(v)}}\right), & p_{k,t,i} \text{ and } q_{k,t,i} \text{ exist in the sensing range,} \end{cases}$$

wherein, $\tilde\theta_{f,k,t,i} = \pi - [(\theta_{fl,k,t,i}-\beta_{fl,k,t})+(\theta_{fr,k,t,i}+\beta_{fr,k,t})]$, $$\theta_{fl,k,t,i} = \tan^{-1}\frac{p_{x,k,t,i}-\frac{L}{2}}{\frac{W}{2}-p_{y,k,t,i}}, \quad \theta_{fr,k,t,i} = \tan^{-1}\frac{p_{x,k,t,i}-\frac{L}{2}}{\frac{W}{2}+p_{y,k,t,i}}$$

$$\theta_{rl,k,t,j} = \tan^{-1}\frac{q_{x,k,t,j}+\frac{L}{2}}{\frac{W}{2}-q_{y,k,t,j}}, \quad \theta_{rr,k,t,j} = \tan^{-1}\frac{q_{x,k,t,j}+\frac{L}{2}}{\frac{W}{2}+q_{y,k,t,j}}$$

$$\theta_{f,c} = \frac{K_{MP,f}}{v}, \quad \theta_{r,c} = \frac{K_{MP,r}}{v},$$

$K_{obs}$ is a weighting parameter, $K_{MP,f}$ and $K_{MP,r}$ are weighting values, $p_{k,t,i}$ is a coordinate of an i-th obstacle detected within a front sensing range at the time t, $q_{k,t,j}$ is a coordinate of a j-th obstacle detected within a side sensing range at the time t.

6. The method according to claim 4, wherein a second term of the cost function further includes the following term:

$$\lambda_k h(\xi_{k,t}, u_{k,t}) + \mu_u G_u(u_{k,t}) + \mu_{\delta_f} G_{\delta_f}(\delta_{f,k,t}) + \mu_{\alpha_f} G_{\alpha_f}(\alpha_{f,k,t}) + \mu_{\alpha_r} G_{\alpha_r}(\alpha_{r,k,t})$$

wherein, $\lambda_k$ is Lagrange multiplier, $h(\xi_{k,t}, u_{k,t})$ is a coordinate of the center of the gravity of the vehicle in an inertial frame for $(\xi_{k,t}, u_{k,t})$, $\mu_u, \mu_{\delta_f}, \mu_{\alpha_f}, \mu_{\alpha_r}$ are KKT (Karush-Kuhn-Tucker) variables representing weighting parameters for saturation constraints, $$G_u(u_{k,t}) = \begin{cases} \frac{1}{2}g_u(u_{k,t})^2, & \text{if } g_u(u_{k,t}) > 0 \\ 0, & \text{if } g_u(u_{k,t}) \leq 0, \end{cases}$$

$$G_{\delta_f}(\delta_{f,k,t}) = \begin{cases} \frac{1}{2}g_{\delta_f}(\delta_{f,k,t})^2, & \text{if } g_{\delta_f}(\delta_{f,k,t}) > 0 \\ 0, & \text{if } g_{\delta_f}(\delta_{f,k,t}) \leq 0, \end{cases}$$

$$G_{\alpha_f}(\alpha_{f,k,t}) = \begin{cases} \frac{1}{2}g_{\alpha_f}(\alpha_{f,k,t})^2, & \text{if } g_{\alpha_f}(\alpha_{f,k,t}) > 0 \\ 0, & \text{if } g_{\alpha_f}(\alpha_{f,k,t}) \leq 0, \end{cases}$$

$$G_{\alpha_r}(\alpha_{r,k,t}) = \begin{cases} \frac{1}{2}g_{\alpha_r}(\alpha_{r,k,t})^2, & \text{if } g_{\alpha_r}(\alpha_{r,k,t}) > 0 \\ 0, & \text{if } g_{\alpha_r}(\alpha_{r,k,t}) \leq 0, \end{cases}$$

$$g_u(u_{k,t}) = |u_{k,t}| - u_{sat} \leq 0,$$

$$g_{\delta_f}(\delta_{f,k,t}) = |\delta_{f,k,t}| - \delta_{f,sat} \leq 0,$$

$$g_{\alpha_f}(\alpha_{f,k,t}) = |\alpha_{f,k,t}| - \alpha_{f,sat} \leq 0,$$

$$g_{\alpha_r}(\alpha_{r,k,t}) = |\alpha_{r,k,t}| - \alpha_{r,sat} \leq 0,$$

$\delta_f$ is a front steering angle of the vehicle, $\alpha_f, \alpha_r$ are front and rear tire slip angles, respectively, and a subscript sat indicates a saturation constraint.

7. An apparatus for steering a vehicle, the apparatus comprising:
a path determination unit configured to determine a first path by using a starting point and a destination of the vehicle and determine a second path that avoids an obstacle by using a parallax information;
an obstacle sensor configured to generate an obstacle position signal by detecting the obstacle during an operation of the vehicle; and
a parallax information generation unit configured to generate the parallax information by using the obstacle position signal and transmit the parallax information to the path determination unit, wherein the parallax information includes the following moving direction angles:

$$\beta_{fl,k,t} = \tan^{-1}\frac{v\sin\beta_{k,t} + \frac{L}{2}\dot{\varphi}_{k,t}}{v\cos\beta_{k,t} - \frac{W}{2}\dot{\varphi}_{k,t}}, \quad \beta_{fr,k,t} = \tan^{-1}\frac{v\sin\beta_{k,t} + \frac{L}{2}\dot{\varphi}_{k,t}}{v\cos\beta_{k,t} + \frac{W}{2}\dot{\varphi}_{k,t}},$$

$$\beta_{rl,k,t} = \tan^{-1}\frac{v\sin\beta_{k,t} - \frac{L}{2}\dot{\varphi}_{k,t}}{v\cos\beta_{k,t} - \frac{W}{2}\dot{\varphi}_{k,t}}, \quad \beta_{rr,k,t} = \tan^{-1}\frac{v\sin\beta_{k,t} - \frac{L}{2}\dot{\varphi}_{k,t}}{v\cos\beta_{k,t} + \frac{W}{2}\dot{\varphi}_{k,t}}.$$

wherein L is an axle length of the vehicle, W is a width of the vehicle, $\beta_{fl,k,t}$, $\beta_{fr,k,t}$, $\beta_{rl,k,t}$ and $\beta_{rr,k,t}$ are moving direction angles at four vertices of the vehicle, respectively, $\beta_{k,t}$ is a moving direction angle of the center of the gravity of the vehicle, $\dot{\varphi}_{k,t}$ is a yaw angle, $v$ is a velocity of the vehicle.

8. The apparatus according to claim 7, wherein the vehicle is an unmanned ground vehicle (UGV).

9. The apparatus according to claim 7, wherein the path determination unit determines the second path by using a model predictive approach.

10. The apparatus according to claim 9, wherein the second path determined by the model predictive approach have variables that minimize a cost function, which is expressed in the following equation:

$$J(\xi_t, u_t) = \phi(\tilde{\eta}_{N,t}) + \sum_{k=0}^{N-1} L(\tilde{\eta}_{k,t}, u_{k,t})$$

wherein, $\xi_t$ is a state variable vector at a time t, $u_t$ is a control input vector, $$\phi(\tilde{\eta}_{N,t}) = \frac{1}{2}\tilde{\eta}_{N,t}^T P\tilde{\eta}_{N,t}, \quad L(\tilde{\eta}_{k,t}, u_{k,t}) = \frac{1}{2}\tilde{\eta}_{k,t}^T Q\tilde{\eta}_{k,t} + \frac{1}{2}u_{k,t}^T R u_{k,t}$$

(P, Q and R are constant weighting matrices, N is a length of a look-ahead horizontal, $\tilde{\eta}_{k,t} = \eta_{k,t,ref} - \eta_{k,t}$, $\eta_{k,t,ref}$ is a coordinate of the first path, $\eta_{k,t}$ is a coordinate of a center of gravity of the vehicle in an inertial frame).

11. The apparatus according to claim 10, wherein a parallax cost function is further included in a second term of the cost function so that the parallax information is used in determining the second path, the parallax cost function being expressed as follows:

$$PF_{obs,k,t,i,j} = \begin{cases} 0, & \text{no obstacle exists in the sensing range,} \\ \max_i K_{obs}\exp\left(\frac{\tilde{\theta}_{f,k,t,i}}{\theta_{f,c(v)}}\right), & p_{k,t,i} \text{ exists in the sensing range,} \\ \max_i K_{obs}\exp\left(\frac{\tilde{\theta}_{r,k,t,j}}{\theta_{r,c(v)}}\right), & q_{k,t,j} \text{ exists in the sensing range,} \\ \max_{i,j} K_{obs}\exp\left(\frac{\tilde{\theta}_{f,k,t,i}}{\theta_{f,c(v)}} + \frac{\tilde{\theta}_{r,k,t,j}}{\theta_{r,c(v)}}\right), & p_{k,t,i} \text{ and } q_{k,t,j} \text{ exist in the sensing range,} \end{cases}$$

wherein, $$\tilde{\theta}_{f,k,t,i} = \pi - [(\theta_{fl,k,t,i} - \beta_{fl,k,t}) + (\theta_{fr,k,t,i} + \beta_{fr,k,t})],$$

$$\tilde{\theta}_{r,k,t,i} = \pi - [(\theta_{rl,k,t,j} - \beta_{rl,k,t}) + (\theta_{rr,k,t,j} + \beta_{rr,k,t})],$$

$$\theta_{fl,k,t,i} = \tan^{-1}\frac{p_{x,k,t,i} - \frac{L}{2}}{\frac{W}{2} - p_{y,k,t,i}}, \theta_{fr,k,t,i} = \tan^{-1}\frac{p_{x,k,t,i} - \frac{L}{2}}{\frac{W}{2} + p_{y,k,t,i}}$$

$$\theta_{rl,k,t,j} = \tan^{-1}\frac{q_{x,k,t,j} + \frac{L}{2}}{\frac{W}{2} - q_{y,k,t,j}}, \theta_{rr,k,t,j} = \tan^{-1}\frac{q_{x,k,t,j} + \frac{L}{2}}{\frac{W}{2} + q_{y,k,t,j}}$$

$$\theta_{f,c} = \frac{K_{MP,f}}{v}, \quad \theta_{r,c} = \frac{K_{MP,r}}{v},$$

$K_{obs}$ is a weighting parameter, $K_{MP,f}$ and $K_{MP,r}$ are weighting values, $p_{k,t,i}$ is a coordinate of an i-th obstacle detected within a front sensing range at the time t, $q_{k,t,j}$ is a coordinate of a j-th obstacle detected within a side sensing range at the time t.

12. The apparatus according to claim 10, wherein a second term of the cost function further includes the following term:

$$\lambda_k h(\xi_{k,t}, u_{k,t}) + \mu_u G_u(u_{k,t}) + \mu_{\delta_f} G_{\delta_f}(\delta_{f,k,t}) + \mu_{\alpha_f} G_{\alpha_f}(\alpha_{f,k,t}) + \mu_{\alpha_r} G_{\alpha_r}(\alpha_{r,k,t})$$

wherein, $\lambda_k$ is Lagrange multiplier, $h(\xi_{k,t}, u_{k,t})$ is a coordinate of the center of the gravity of the vehicle in an inertial frame for $(\xi_{k,t}, u_{k,t})$, $\mu_u, \mu_{\delta_f}, \mu_{\alpha_f}, \mu_{\alpha_r}$ are KKT (Karush-Kuhn-Tucker) variables representing weighting parameters for saturation constraints, $$G_u(u_{k,t}) = \begin{cases} \frac{1}{2}g_u(u_{k,t})^2, & \text{if } g_u(u_{k,t}) > 0 \\ 0, & \text{if } g_u(u_{k,t}) \leq 0, \end{cases}$$

$$G_{\delta_f}(\delta_{f,k,t}) = \begin{cases} \frac{1}{2}g_{\delta_f}(\delta_{f,k,t})^2, & \text{if } g_{\delta_f}(\delta_{f,k,t}) > 0 \\ 0, & \text{if } g_{\delta_f}(\delta_{f,k,t}) \leq 0, \end{cases}$$

$$G_{\alpha_f}(\alpha_{f,k,t}) = \begin{cases} \frac{1}{2}g_{\alpha_f}(\alpha_{f,k,t})^2, & \text{if } g_{\alpha_f}(\alpha_{f,k,t}) > 0 \\ 0, & \text{if } g_{\alpha_f}(\alpha_{f,k,t}) \leq 0, \end{cases}$$

$$G_{\alpha_r}(\alpha_{r,k,t}) = \begin{cases} \frac{1}{2}g_{\alpha_r}(\alpha_{r,k,t})^2, & \text{if } g_{\alpha_r}(\alpha_{r,k,t}) > 0 \\ 0, & \text{if } g_{\alpha_r}(\alpha_{r,k,t}) \leq 0, \end{cases}$$

$$g_u(u_{k,t}) = |u_{k,t}| - u_{sat} \leq 0,$$

-continued $$g_{\delta_f}(\delta_{f,k,t}) = |\delta_{f,k,t}| - \delta_{f,sat} \leq 0,$$

$$g_{\alpha_f}(\alpha_{f,k,t}) = |\alpha_{f,k,t}| - \alpha_{f,sat} \leq 0,$$

$$g_{\alpha_r}(\alpha_{r,k,t}) = |\alpha_{r,k,t}| - \alpha_{r,sat} \leq 0,$$

$\delta_f$ is a front steering angle of the vehicle, $\alpha_f, \alpha_r$ are front and rear tire slip angles, respectively, and a subscript sat indicates a saturation constraint.

* * * * *